UNITED STATES PATENT OFFICE.

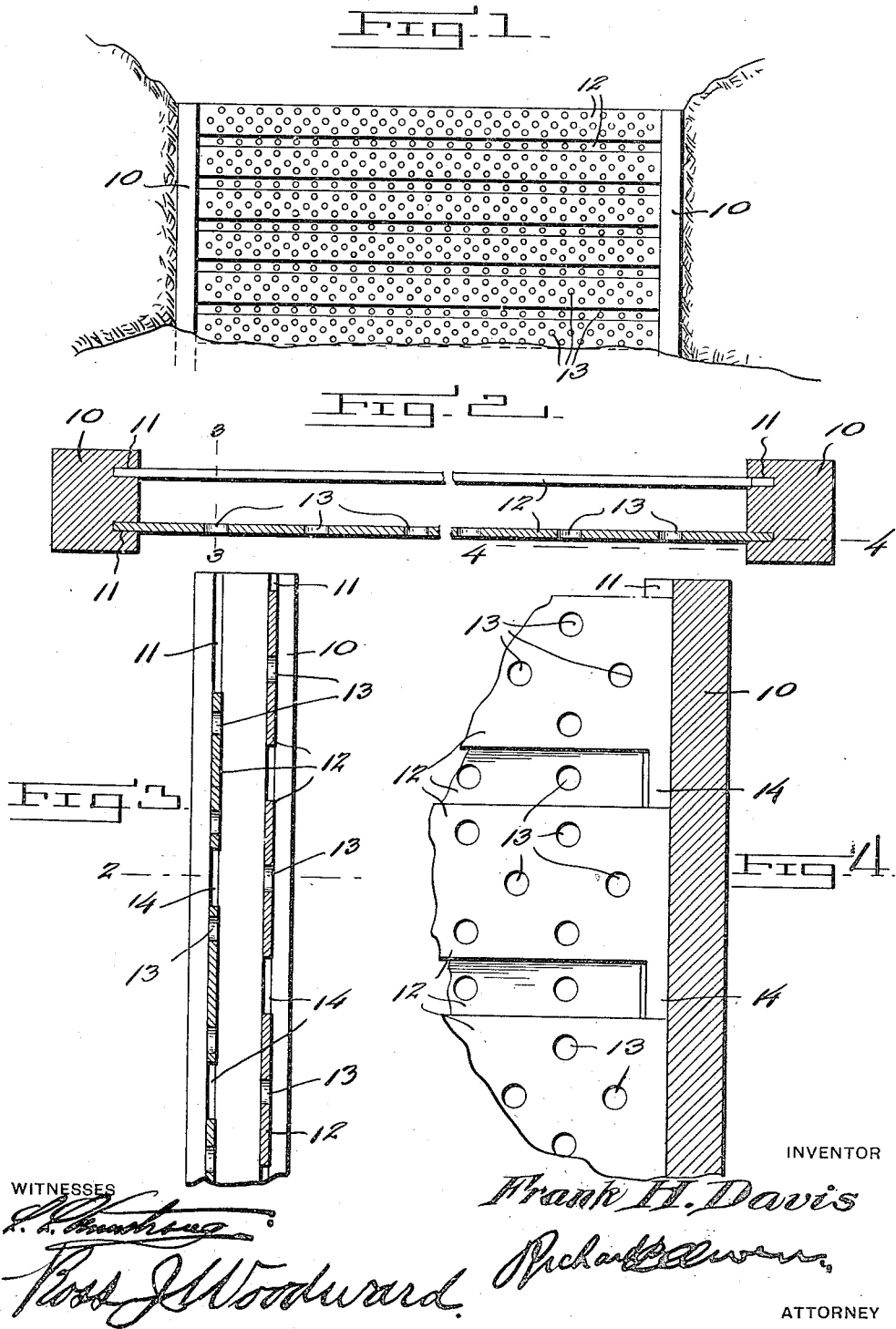

FRANK H. DAVIS, OF EUGENE, OREGON.

FISH-STOP.

1,215,781. Specification of Letters Patent. Patented Feb. 13, 1917.

Application filed August 29, 1916. Serial No. 117,557.

*To all whom it may concern:*

Be it known that I, FRANK H. DAVIS, a citizen of the United States, residing at Eugene, in the county of Lane and State of Oregon, have invented certain new and useful Improvements in Fish-Stops, of which the following is a specification.

This invention relates to an improved fish stop which is intended to be used in connection with an irrigation ditch and the principal object of the invention is to provide a fish stop so constructed that it will prevent fishes from passing into the irrigation ditches from the main stream and which is further so constructed that while it will prevent fishes from entering the irrigation ditch, it will not interfere with the passage of water into the irrigation ditch.

Another object of the invention is to so construct this fish stop, that the protecting plates may be easily removed when desired and to further so construct them that they will be held the proper distance apart when in place.

This invention is illustrated in the accompanying drawings, wherein:—

Figure 1 is a view showing the improved fish guard in elevation.

Fig. 2 is a longitudinal sectional view through the improved ditch guard, the view being taken along the lines 2—2 of Fig. 3.

Fig. 3 is a transverse vertical sectional view through the guard taken along the line 3—3 of Fig. 2.

Fig. 4 is a fragmentary sectional view taken along the line 4—4 of Fig. 2.

This guard is placed at the entrance of an irrigating ditch and includes posts or standards 10 which are placed at the sides of the ditch and are provided with vertically extending grooves 11 in which the guard plates 12 will be placed. These plates 12 are positioned in staggered relation as clearly shown in Fig. 3 and are provided with openings 13 forming passageways through which water may pass. These baffle plates 12 are held in spaced relation by the supporting legs 14 and therefore the water can easily pass between the baffle plates as well as through the passageways 13. With this structure, the guard may be built to any height desired, it being simply necessary to provide the posts or standards the desired height. It should be further noted that with this structure, the plates can be put in place and the lower plates forced down into the bed of the ditch by pressure upon the upper plates.

What is claimed is:—

1. A ditch guard comprising posts provided with set or vertically extending grooves, baffle plates positioned in one set of grooves in superposed relation and provided with openings forming passageways, baffle plates positioned in the second set of grooves in superposed relation and in staggered relation to the first set of baffle plates and provided with openings forming passageways, and legs extending from each baffle plate to engage the next lower plate and hold the plates of each set in spaced relation.

2. A ditch guard comprising sets of baffle plates, the plates of each set being positioned in superposed relation and in staggered relation to the plates of the second set, said plates being provided with openings forming passageways and the plates of each set being provided with depending legs engaging the next lower plates to hold the plates in spaced relation.

In testimony whereof I affix my signature in presence of two witnesses.

FRANK H. DAVIS.

Witnesses:
  A. C. WILLIAMS,
  H. G. WHITESIDE.

Copies of this patent may be obtained for five cents each, by addressing the "Commissioner of Patents, Washington, D. C."